United States Patent [19]
Hoffman

[11] Patent Number: 5,085,446
[45] Date of Patent: Feb. 4, 1992

[54] PORTABLE SPORTSMAN SEATING APPARATUS

[76] Inventor: Larry D. Hoffman, 2018 Housel Craft Rd., Bristolville, Ohio 44402

[21] Appl. No.: 541,135

[22] Filed: Jun. 20, 1990

[51] Int. Cl.⁵ .............................................. B62B 13/00
[52] U.S. Cl. ................................. 280/19.1; 135/115; 135/901
[58] Field of Search ................. 280/14.1, 19.1, 28.12, 280/816, 845; 52/143; 296/10; 297/184; 135/901, 109, 115

[56] References Cited

U.S. PATENT DOCUMENTS

| | | | |
|---|---|---|---|
| 2,464,884 | 3/1949 | Noyes | 280/19.1 |
| 2,632,454 | 3/1953 | Skogen | 280/19.1 X |
| 2,681,809 | 6/1954 | Hamill | 280/28.12 |
| 2,737,397 | 3/1956 | Turner | 280/19.1 |
| 2,780,471 | 2/1957 | Lempke | 280/19.1 |
| 2,891,562 | 6/1959 | Kruczynski | 135/901 X |
| 3,030,122 | 4/1962 | Madera | 280/28.12 |
| 3,436,119 | 4/1969 | Lehmann | 280/19.1 X |
| 3,507,293 | 4/1970 | DuBray | 280/19.1 |
| 3,509,891 | 5/1970 | DeBolt | 297/184 |
| 3,744,842 | 2/1973 | Ronning | 135/901 X |
| 3,820,805 | 6/1974 | Tuomala | 135/901 X |
| 4,265,261 | 5/1981 | Barker | 135/901 X |
| 4,285,529 | 8/1981 | Vaillancourt | 280/19.1 |
| 4,438,940 | 3/1984 | Hunt | 280/28.12 X |
| 4,456,272 | 6/1984 | Kroeger | 280/19.1 |
| 4,625,468 | 12/1986 | Hampel | 135/115 X |
| 4,766,918 | 8/1988 | Odekirk | 135/106 X |
| 4,846,205 | 7/1989 | Knoll | 135/106 |
| 4,870,984 | 10/1989 | Roth | 280/19.1 X |
| 4,917,127 | 4/1990 | Marble et al. | 135/901 X |
| 4,918,853 | 4/1990 | Bascom et al. | 280/19.1 X |

OTHER PUBLICATIONS

"Popular Science" Magazine, Dec. 1961 Issue, pp. 134–135.

*Primary Examiner*—Andres Kashnikow
*Assistant Examiner*—Brian L. Johnson
*Attorney, Agent, or Firm*—Robert R. Hussey

[57] ABSTRACT

A portable sportsman seating apparatus has a seat frame mounted on at least one ski for movement between locations. The seat frame has a chamber with a seating surface on the top of the chamber. A flotation cushion is provided defining the seating surface and is supported by the seat frame. The chamber has a bottom with at least one aperture therethrough to allow air to flow into the chamber and thereby allow combustion in the lantern to be supported in the chamber. The seat frame also has a plurality of sides one of which sides is formed at least in part from a material that allows light to pass therethrough and another side which forms the top of the chamber. The top of the chamber has at least a portion thereof formed from material having aperture therethrough which allows the flow of heated air to flow from the chamber. The seating apparatus also includes a collapsible shelter frame having at least a pair of frame members of an inverted generally "U" shape when in the assembled position. The ends of each of the shelter frame members are secured to the seat frame when in the assembled position. The seating apparatus also includes a shelter frame cover extending between the shelter frame members to provide a shelter above the seating surface with an opening adjacent to the one side of the seat frame that allows light to pass therethrough.

3 Claims, 4 Drawing Sheets

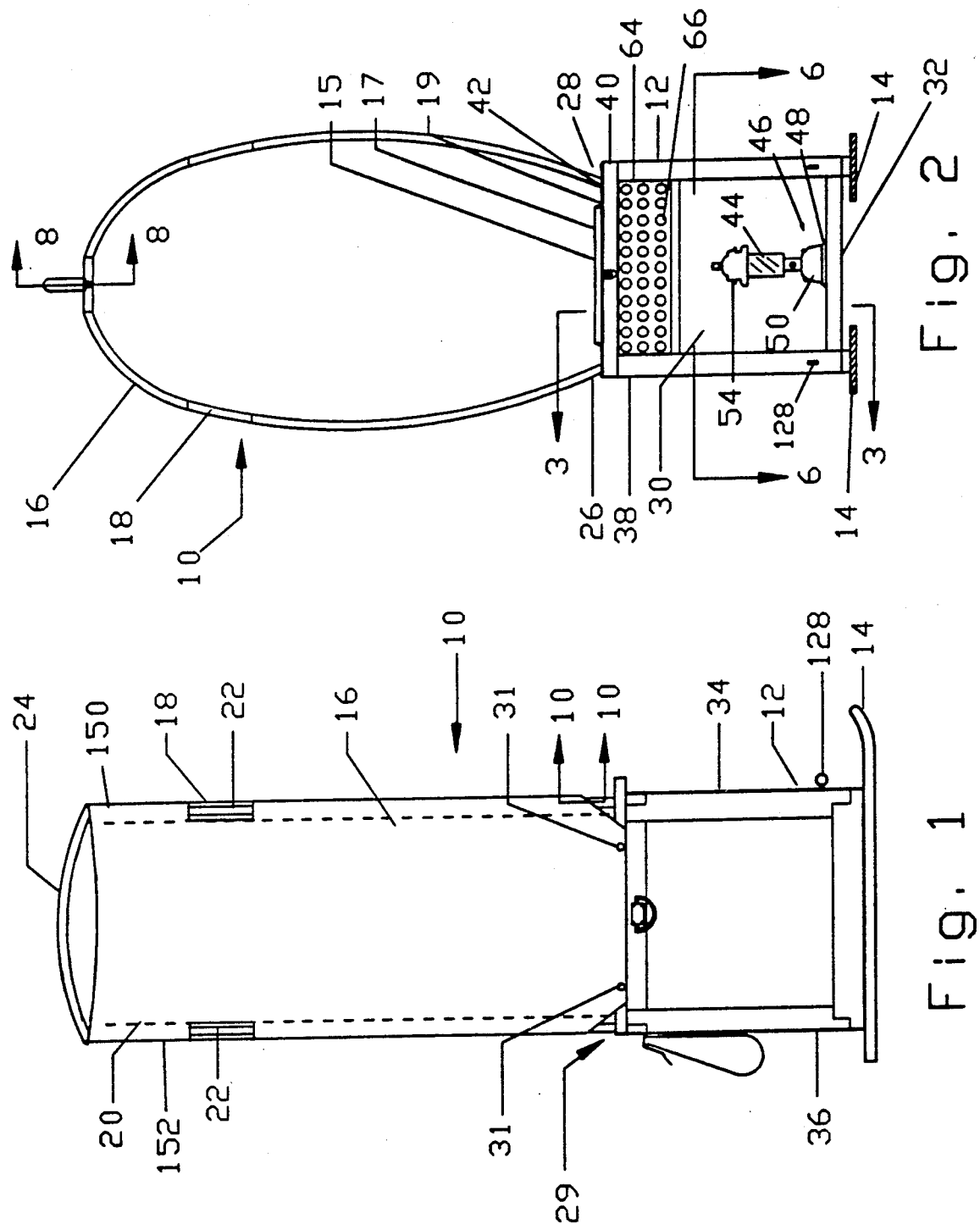

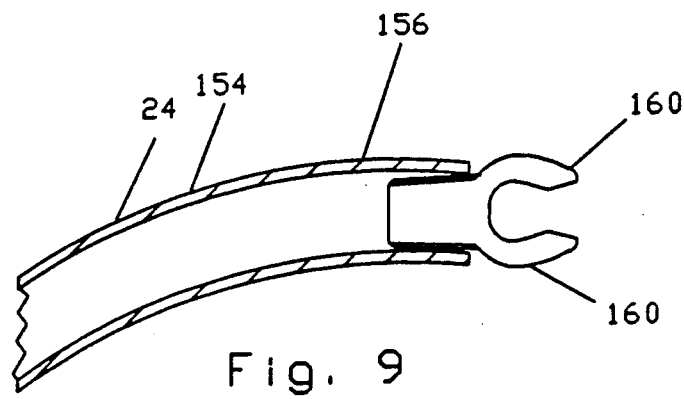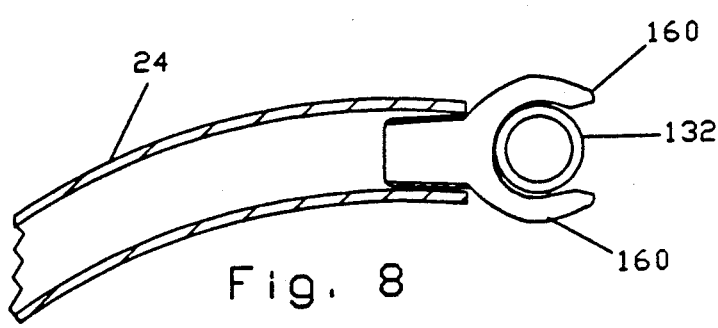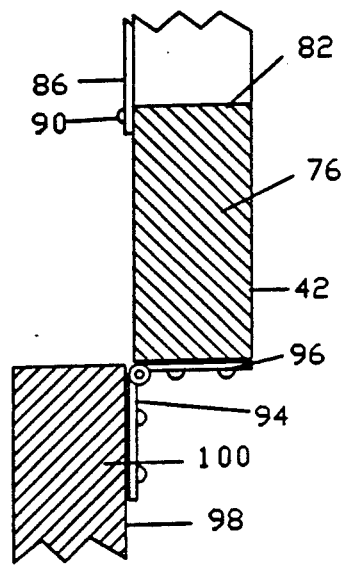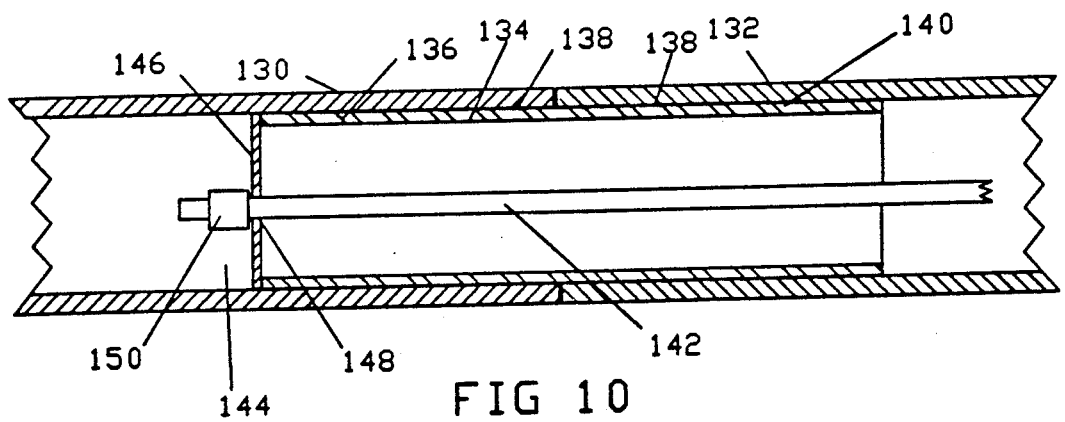

PORTABLE SPORTSMAN SEATING APPARATUS

BACKGROUND OF THE INVENTION

The present invention relates to a portable sportsman seating apparatus and more particularly to a portable sportsman seating apparatus which provides a seat, shelter, flotation device, heat, and light for the sportsman using the seating apparatus.

Outdoor cold weather sports and recreation such as ice fishing and spearing, game hunting and exploration and travel, both on foot and by snowmobile, have grown in activity in recent years. When an outdoor sportsman travels to a remote location and selects a site, the sportsman is on many occasions in inclement weather and exposed to the elements, such as cold, snow, ice, and winds. To improve the comfort and chances of success of the sportsman, it is desirable to provide a portable sportsman seating apparatus which provides a seat, shelter, flotation device, heat, and light for the sportsman at that location.

Since the sportsman is usually going to remote locations, it is desirable that the portable seating apparatus be easily transportable both by vehicle, to get to the sporting grounds, and manually over rugged terrain to get to the remote sporting site. During the transport of the portable sportsman seating apparatus to the remote site, it is desirable that all of the components of the apparatus be compactly secured in the seat and that the seat provide additional space for transporting other sporting equipment, so as to allow more mobility to the sportsman when moving to his sporting site.

For example, ice fishermen transport their equipment by vehicle to the body of water that they will fish and then manually take their equipment after arriving at that site across the ice to a ice fishing site of their choice. To allow for manual transport, it is desirable for a portable seating apparatus to be movable on skis or runners or the like. To provide a transportable seating apparatus, it is also desirable that the seating apparatus be light in weight and compact in size.

When traveling to a remote sporting site and staying at that site, the sportsman will at times be on ice. If the ice breaks, it is desirable that a flotation device be readily available to save the sportsman from submerging in water.

In many instances the outdoor sportsman travels alone and others are not available to assist him in setting up at his remote site. It is desirable that the construction and dismantling of the seating apparatus require only one person. Since the sportsman is exposed to the elements when erecting, constructing or dismantling or collapsing the shelter and otherwise setting up on the site, it is desirable that the setting up of the seat or dismantling of the seat be accomplished in a minimum amount of time. It is desirable that the seat be capable of relatively rapid erection or dismantling.

When the sportsman sets up at his selected location, it is desirable to provide a shelter above the seat to protect the sportsman from the adverse elements. It is also desirable that such a shelter be collapsible and light in weight to allow ease of transport.

After the sportsman sets up at his location, it is desirable to provide a source of light and heat to the sportsman. For example, an ice fisherman fishes during times of low ambient light conditions and a source of light allows the sportsman to fish more effectively.

Since ice fishing is also conducted in inclement weather conditions, it is desirable that heat be provided in a manner that will minimize the effect of the inclement weather on the comfort of the sportsman. It is desirable that a portion of the heat be retained by the collapsible shelter to provide an improved ambient temperature in the shelter. It is also desirable for an ice fisherman to have heat supplied to the location that his hands will be in since this is an area of the body that gets cold quickly when ice fishing.

Even after setting up at a site, it is desirable to be able to easily move from one site to the other. For example, experienced ice fisherman prefer to cover a lot of ice and drill a lot of holes to find fish because the fish may move. Accordingly, it is desirable to provide a seating apparatus which after erection at one particular ice hole can be readily moved from ice hole to ice hole and thereby maximize the effectiveness of the ice fisherman.

On occasion, the portable seating apparatus may be used in comfortable ambient temperatures. In such a case, the shelter is not necessary and may be removed and stored in the seat during use of the seat. The portable seating apparatus may also be used for observing winter spectator activities.

SUMMARY OF THE PRESENT INVENTION

The present invention provides the above described desirable features with an improved portable sportsman seating apparatus which provides a seat, shelter, heat and light for the sportsman when using the seating apparatus. The portable sportsman seating apparatus of the present invention provides a seat frame having a chamber and a seating surface on the top of the chamber. A flotation device such as a cushion is provided defining the seating surface and is supported by the seat frame. The seat frame is mounted on a pair of skis or runners to allow for towing over rugged terrain to get to a remote sporting site.

The seating apparatus also includes a shelter with a collapsible frame and a cover which is supported by the shelter frame members when in an assembled condition to provide a shelter above the seating surface with an opening adjacent one side of the seat frame.

The shelter frame and shelter frame cover are collapsible from an assembled condition on the seat frame. In the collapsed condition, the shelter is mountable on or in the seat frame when transported between sporting sites. The portable sportsman seating apparatus also includes a lantern mounted in the chamber of the seat frame. The seat frame chamber has additional space to put sporting equipment when moving to a sporting site. Accordingly, the hunting equipment and all of the components for the seating apparatus may be carried by the seating apparatus and conveniently towed across rugged terrain to a sporting site which allows for mobility of the sportsman when moving in a compact size.

The shelter frame of the portable sportsman seating apparatus of the present invention includes a pair of frame members having an inverted generally "U" shape when in an assembled condition. Each of the shelter frame members is comprised of a plurality of tubes and an elastic cord extending through the tubes with the ends of the elastic cord secured to the tube portions forming the ends of the shelter frame member. Accordingly, ready assembly of the shelter frame members may be had by properly positioning the tube portions with respect to each other and inserting the ends of each of the frame members in openings in the top of the seat frame.

A shelter frame cover is secured to the shelter frame members and the seat frame to provide a shelter over the seat frame when in an assembled condition. Such a construction allows for rapid assembly or disassembly of the portable sportsman seating apparatus of the present invention, while being light in weight yet still allowing ease of transport from one sporting site to the other. Also, such assembly and disassembly requires only one person without the need of assistance by others.

The present invention provides a portable sportsman seating apparatus having a source of light and heat for the sportsman. The source of light and heat is provided by, for example, the lantern mounted in the chamber of the seat frame. The bottom of the seat frame has openings or apertures that allow air to flow into the chamber to support combustion in the lantern. The lantern produces both light and heat and the seat frame has a side which is formed at least in part from material that allows light to pass therethrough.

The shelter has an opening on the same side of the seating apparatus as the side of the seat frame that allows light to flow therethrough which allows the sportsman to see during low ambient light conditions. Another portion of the side of the seating apparatus through which light passes allows a portion of the heat of the light from the lantern to flow so that heat is supplied to the hands and legs of the sportsman seated on the seating apparatus of the present invention.

The seating apparatus of the present invention also provides a flotation device that is readily available to the sportsman.

The seating apparatus of the present invention further provides for heating the shelter when assembled to the seat frame by means of the lantern. The top of the seat frame has a portion thereof formed from material having apertures therethrough which allows the flow of air heated by the lantern to flow into the shelter. Accordingly, the detrimental effect of inclement weather on the comfort of the sportsman is decreased.

The present invention also provides a seating apparatus which is easily movable from one site to the other site when it is in the assembled condition. Since the entire apparatus is mounted on skis, when the shelter is assembled to the seat frame, the sportsman can move the assembled seating apparatus from one site to the other and thereby maximize his effectiveness.

The seating apparatus of the present invention also allows flexibility dependent upon the ambient temperatures. In comfortable ambient temperatures, the shelter need not be erected and the lantern need not be functional. If the ambient temperatures decrease or the wind creates a significant chill factor, the shelter may be easily assembled and erected and the lantern started to provide heat and light as required.

BRIEF DESCRIPTION OF THE DRAWINGS

FIG. 1 is a side elevational view of the portable sportsman seating apparatus of the present invention having a seat frame and a shelter;

FIG. 2 is a front elevational view of the seating apparatus shown in FIG. 1;

FIG. 7 is a partial sectional view of the seating apparatus shown in FIG. 6 and taken along lines 7—7 thereof;

FIG. 8 is a sectional view of a portion of the seating apparatus shown in FIG. 2 in an assembled condition and taken along lines 8—8 thereof;

FIG. 9 is a partial sectional view of the seating apparatus frame shown in FIG. 8 in an unassembled condition; and FIG. 10 is a partial sectional view of the seating apparatus shown in FIG. 1 and taken along lines 10—10 thereof.

DETAILED DESCRIPTION OF THE INVENTION

Figure 3:
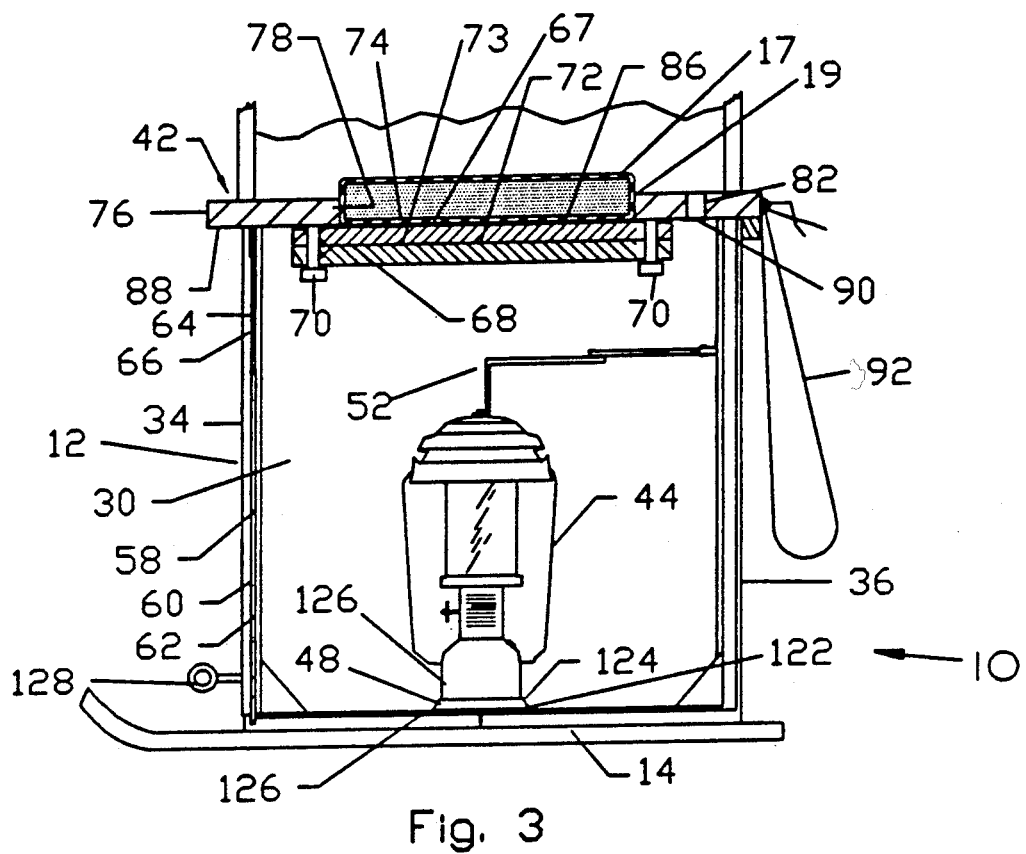
FIG. 3 is a sectional view of a portion of the seating apparatus shown in FIG. 2 and taken along lines 3—3 thereof, showing a lantern removably secured to the seat frame and linkage for removably securing the top of the lantern to the seat frame.

Referring now more specifically to the drawings and in particular FIGS. 1 and 2, a portable sportsman seating apparatus 10 that provides a seat, shelter, heat and light for the sportsman embodying the features of the present invention is shown.

The portable sportsman seating apparatus 10 has a seat frame 12 and a pair of skis or runners 14 on which the seat frame is mounted. The skis 14 facilitate movement of the seating apparatus 10 over rugged terrain to reach a remote site. The seat frame 12 has a seating surface 15 on its top defined by a flotation device or cushion 17. The flotation cushion 17 is removably received in the depression 19 of the seat frame 12. If it becomes necessary to use a flotation device to save the sportsman from submerging in water, the flotation cushion 17 is readily available.

The seating apparatus 10 also includes a shelter 16 which is securable to the frame 12 when the seating apparatus 10 is in an assembled condition. The shelter 16 provides shelter to the sportsman when in an assembled or erected condition and is collapsible to an unassembled condition. In a collapsed condition the shelter 16 has a compact size to facilitate transport.

The shelter 16 includes a shelter frame 18, and a shelter frame cover 20. The shelter frame 18 includes a pair of frame members 18 having an inverted generally "U" shape when in an assembled condition and at least one spreader 24 positioned between the shelter frame members 18 when in the assembled condition. The ends 26, 28 of each of the shelter frame members 18 are secured to the seat frame 12 when in the assembled condition. The shelter frame cover 20 is secured to the shelter frame members 18 and the seat frame 12 by the securing means 29, 31 respectively to provide a shelter 16 over the seat frame when in an assembled condition.

The seat frame 12 has a chamber 30 defined by the bottom 32, front and rear sides 34, 36 respectively, and sides 38, 40 and a top 42. The bottom 32 is secured to the skis 14 with the bottom 32 slightly raised above the skis to allow for ease of passage over rugged terrain and to allow air to flow under the bottom 32 of the seat frame 12.

To provide heat and light for the sportsman when using the seating apparatus 10 of the present invention, a source of light and heat, such as the lantern 44, is mounted in the chamber 30. The lantern 44 may be any conventional known means that provides a source of light and heat.

Figure 4:
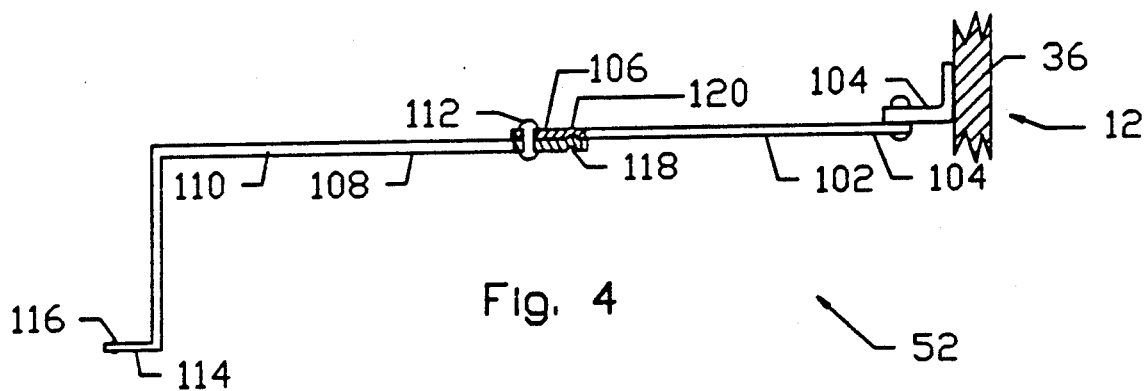
FIG. 4 is an expanded partial cross-sectional expanded view of the linkage for removably securing the top of the lantern to the seat frame.

As seen in FIGS. 2, 3, and 4, means 46 are provided for securing the lantern 44 to the seat frame 12 and includes a bottom lantern support means 48 for removably securing the base 50 of the lantern to the bottom 32 of the seat frame. The lantern securing means 46 also includes a top lantern supporting means 52 for selectively securing the top 54 of the lantern 44 to the seat frame 12. Accordingly, the lantern is securable inside of the chamber 30, while being removable to service the lantern. The securing means 46 assures the lantern 44 will remain stationary during movement of the seating apparatus 10 and avoid inadvertent movement of the lantern 44.

Figure 6:
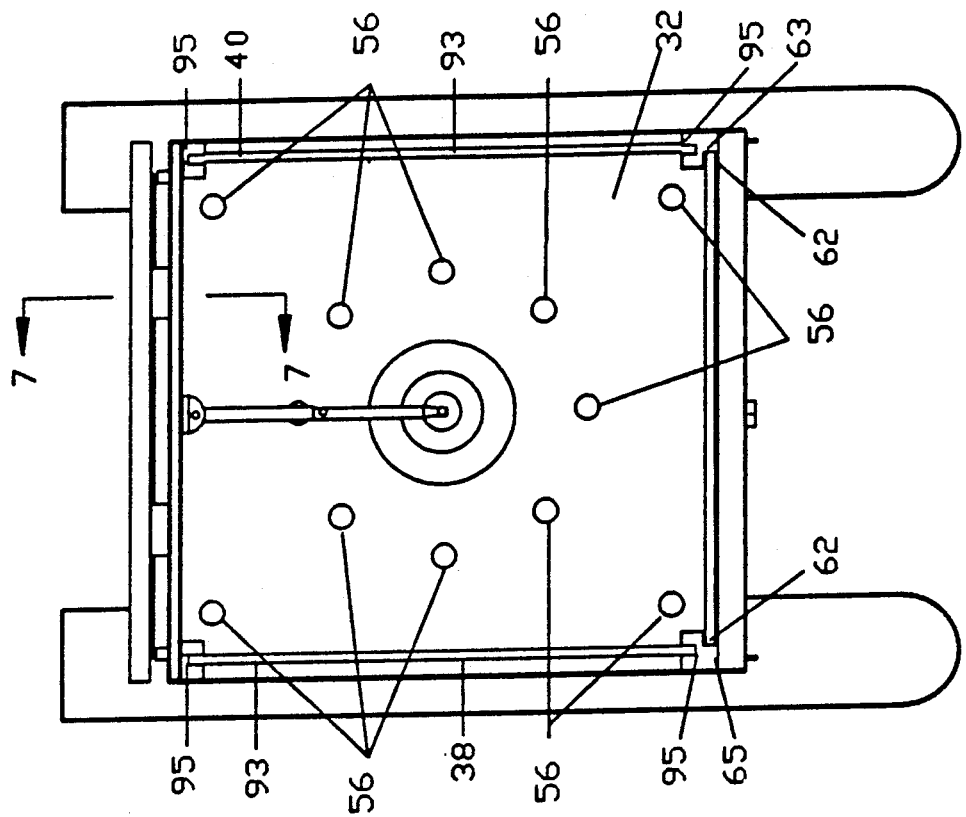
FIG. 6 is a partial sectional view of the seating apparatus shown in FIG. 2 taken along lines 6—6 thereof.

To facilitate movement of air into the chamber 30 and support combustion of the lantern 44 in the chamber, the bottom 32 has a plurality of apertures 56 as seen in FIG. 6.

When combustion occurs in the lantern 44, both light and heat are produced as is known. To effectively use the light, the lower portion 58 of the front 34 is formed of material that allows the light to pass therethrough such as transparent or translucent material, such as the safety glass panel 60 as seen in FIG. 3. Any known translucent or transparent material may be used for the panel 60.

Accordingly, the sportsman, when seated facing the front 34 of the seating apparatus 10, can see in low ambient light conditions and more effectively conduct his supporting activities. Since the light transmitting panel 60 is mounted in the slots 62 of the frame corner members 63, 65, as shown in FIG. 6, the panel 60 may be readily removed and replaced with an opaque panel if the light is not desirable, such as for example, when one is deer hunting.

The upper portion 64 of the front side 34 is formed from a material having a plurality of apertures 66 as seen in FIGS. 2 and 3 to allow the flow of heated air from the lantern 44 therethrough as seen in FIG. 3. When the sportsman is seated on the seating apparatus 10, the air flows through the portion 64 and out of the chamber 30. Since the sportsman's hands and legs are generally located adjacent to the portion 64, the sportsman's hands and legs will be heated.

Figure 5:
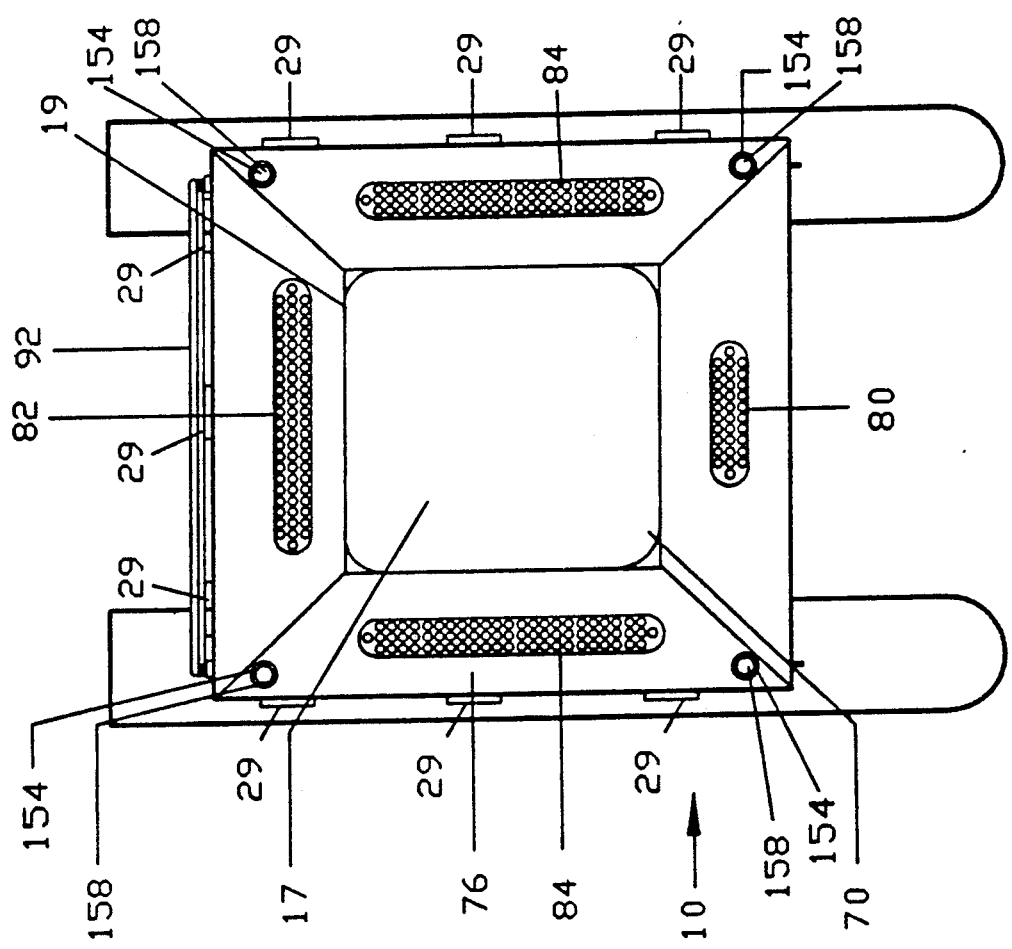
FIG. 5 is a top view of the seating apparatus shown in FIG. 2 with the shelter removed.

The sportsman is provided with a flotation device or cushion 17 as seen in FIGS. 3 and 5 which is of any conventional design such as a life preserver. The flotation cushion 17 is removably received in the depression 19 of the seat frame 12. The top 42 of the seat frame 12 has a top seat frame member 76 which has an aperture 78 therein for receiving the cushion 17 therein. The aperture 78 is sized to receive a standard life preserver cushion therein. The bottom 67 of the depression 19 is formed from a seat support member 68 positioned adjacent the aperture 78.

A protective sheet of fire retardant material 74 is positioned against the bottom 72 of the seat support member 68. The fire retardant material 74 protects the top 42 from combustion when the lantern 44 is in operation. Means such as the screws 70 are provided to secure the seat support member 68 and fire retardant sheet 74 to the top seat frame member 76 so that the depression 19 is formed by the top seat frame member 76 and the seat support member 68.

When assembled, the flotation cushion 17 is received in the depression 19 and can be readily removed in an emergency.

To provide heat to a sportsman sitting on the seating apparatus 10, the top seat frame member 76 has front and rear apertures or slots 80, 82 and side apertures or slots 84 as seen in FIG. 5 through which heat flows to heat the sportsman when seated on the seat 70. To prevent contaminants from dropping into the chamber 30 through the slots 80, 82, 84, screen portions 86 are provided and mounted to the bottom 88 of the top frame member 76 by any conventional means, such as threaded fasteners 90 as seen for example on FIG. 7. The screen material 86 has openings 91 therein as seen in FIGS. 3 and 5 of sufficient size to allow the flow of heated air therethrough around the cushion 17 and are of a size to prohibit large contaminants and articles from dropping through the slots 80, 82, 84 into the chamber 30. The back slot 82 allows heat to flow to the back of the sportsman when seated on the seat 10. The side vents 84 provide heated air to the sides of the sportsman. The front slot 80 in the front of the seat cushion 17 operates as a hand warmer for the sportsman, for example, an ice fisherman holding a fishing pole.

In operation, a sportsman, such as an ice fisherman, generally transports the seating apparatus 10 to a sporting site such as a frozen lake in a vehicle with the shelter 16 in a collapsed condition. The seating apparatus is removed from the vehicle and prepared to move across a frozen body of water and in some cases rugged terrain in order to reach the desired remote site. Upon removal of the seating apparatus 10 from the vehicle, the sportsman prepares the seating apparatus 10 for traveling to the remote site. In some cases, it is desirable to place equipment in the chamber 30 to allow for easy transport of the equipment or, alternatively, to secure the equipment to the apparatus 10 in other manners.

A pouch 92 as seen in FIGS. 3 and 5 is provided and secured to the back 36 of the seat frame 12 by any known means such as snap fasteners. The pouch 92 may be used to hold the shelter 16 when in a collapsed condition and may also be of sufficient size to carry other sporting equipment. It should be understood that other pouches may be attached to the seating apparatus 10 of the present invention to allow transport of other sporting equipment.

In some instances, light is required for the sportsman as he travels to the remote location. If this is the case, it is desirable to light the lantern 44 or otherwise service the lantern to assure its operation and sufficient fuel.

In some cases, it is desirable to have light at the sides 38, 40 of the seat as seen in FIG. 6. The sides 38, 40 have side panels 93 that are retained by slots in the frame 12. Accordingly, the side panels 93 can be easily removed and replaced. If it is desirable to have light at one or both of the sides 38, 40, a side panel 93 of light transmitting material may be inserted into the slots 95 so that the light from the lantern passes therethrough. If on the other hand, light is not desirable at one or both sides 38, 40, an opaque side panel 93 is positioned between the slots 95.

The top seat frame member 76 is mounted to the sides 34, 36, 38, 40 in any desirable manner. Preferably, the top seat frame member 76 is pivotally mounted to the back side 36 as seen in FIG. 7 by means of the hinges 94. The hinges 94 are secured to the back 96 of the top seat frame member 76 and to the back 98 of the back frame member 100 so as to allow the top 42 to be pivoted and raised to allow access to the chamber 30. The back frame member 100 forms a portion of the rear side 36.

When the top of the chamber 30 is opened for access by the sportsman, the sportsman may service and/or light the lantern.

As seen in FIGS. 2 and 3, the means 46 for securing the lantern 44 to the seat frame allows removal of the lantern 44 from the seat frame for servicing or recharging of fuel. The means 46 for securing the lantern 44 to the seat frame 12 allows for removal of the lantern from the seat frame 12.

To remove the lantern 44 from the chamber 30, the top of the lantern supporting means 52 for securing top of the lantern 44 to the seat frame 12 is moved to a release position. The top lantern supporting means 52 as seen in FIGS. 3 and 4 include a lantern support member 102 having one end 104 pivotally connected to the rear side 36 of the seating apparatus 10 by means of a bracket 104. The other end 106 of the support member 102 is pivotally connected to the end 108 of the lantern top support member 110 by means of the rivet 112. The other end 112, 114 of the top support member 110 has an opening 116 therethrough through which a fastener from the lantern 44 is inserted and secured to the member 110 to accordingly secure the lantern to the seat frame 12.

To hold the securing members 102, 110 in position, a pair of complimentary detents are provided in the end 108 of the member 110 and end 106 of the member 102. When the detents 118, 120 of the top support members 110, 102 respectively are in an engaged position, the members 110, 102 are releasably retained in an extended position. When the sportsman moves the support members 102, 110 to a retracted position, the detents are moved out of cooperation with each other and the arms 102, 110 are rotated to move them out of the way and allow removal of the lantern 44.

The lantern 44 is also releasably secured to the seat frame 12 by means of the bottom lantern support means 48 as seen in FIG. 3. The bottom lantern support means 48 include a support member 122 having a generally "U" shaped cross-sectional configuration with a lip 124 extending about a portion of the periphery and inwardly thereof. The lip 124 allows the base 126 of the lantern to be snapped into the base 122 and retained therein.

Accordingly, if it is desirable for a sportsman to remove the lantern from the base, the lantern is simply snapped out of the base member 122 and removed from the chamber 30. The sportsman can then service the lantern and provide fuel to the lantern and if desirable light the lantern.

The lantern 44 may then be replaced in the bottom support means 48 by snapping the base 126 of the lantern into the base member 122 so that the lip 124 encompass the base 126 of the lantern 44. The top lantern supporting means 52 is then placed in the extended position as shown in FIG. 4 and secured with a threaded fastener from the lantern extending through the aperture 116 to secure the lantern to the seat frame 12.

Accordingly, when the lantern 44 is lit, light is provided so that a sportsman can move to the remote site in low ambient light and temperature condition. When the shelter 16 is erected, heat is provided as is described herein.

To move the seating apparatus 10 of the present invention to the remote site, eyelets 128 as seen in FIGS. 1, 2, and 3 are provided and secured to the front 34 of the seat frame 12. To provide for ease in towing the seat 10, the sportsman may insert a rope through the eyelets or use means to facilitate towing or other wise transporting the seat 10 across terrain to a selected remote site.

When arriving at the remote site, the sportsman erects the shelter 16 on the seat frame 12. As described above, the shelter 16 includes a shelter frame 18 and a shelter frame cover 20. The shelter frame 18 includes a pair of frame members 18 having an inverted generally "U" shaped configuration when in the assembled condition.

Each of the frame members 18 are formed from a plurality of tubes, such as the tubes or shelter frame members 130, 132 shown in FIG. 10. Each of the frame members 18 are similar in construction and for ease of description only the shelter frame members 130, 132 will be described herein. Each of the shelter frame members that make up the frame member 18 are formed in a desirable shape so as to provide the desired "U" configuration when in the assembled condition. For ease of description the connection between the shelter frame members 130,132 of the frame member 18 will be described, and it is understood that the other tubular portions making up the frame 18 are constructed in a similar manner.

It is desirable that the shelter frame members 130, 132 be readily assembled. The ends 26 and 28 of each of the shelter frame members 18 are provided for securement to the seat frame 12. To facilitate ready assembly of the shelter frame members 130, 132, the shelter frame member portion 130 has an alignment tube 134 inserted therein which is secured to the shelter frame member 130 by an interference frictional fit. That is, the inner diameter 136 of the shelter frame member 130 has an interference fit with the outer surface 138 of the alignment tube 134. The next adjacent shelter frame member 132 has an inner surface 140 that is of sufficient diameter to allow a sliding fit with the outer surface 138 of the alignment tube 134. The alignment tube 134 accordingly allows for ready assembly of the shelter frame members or tubes 130, 132 with each other.

An elastic cord 142 is provided for retaining the shelter frame member portions together and has each end secured to the complimentary shelter frame member 130 by the securing means 144. The securing means 144 includes a washer 146 which abuts the end of the alignment tube 134 and has an opening 148 through which the elastic cord 142 extends. The elastic end cord 142 has a ferrule 150 on each end thereof which abuts the washer 146. The elastic cord allows the tubular portions of the shelter frame member 18 to be in a disassembled position and folded up and placed in the pouch 92. When the frame member 18 is removed from the pouch 92, the alignment tubes 134 are used to align the shelter frame members 130, 132 and the elastic cord yieldably retains the frame member tubular portions in this condition. It should be understood that the elastic cord 142 is of the proper length and elasticity so as to allow such movement yet providing sufficient force to retain the shelter frame members 130, 132 in assembled conditions when the tubular members are assembled.

The shelter 16 also includes a shelter frame cover 20. As seen in FIGS. 1 and 2, the shelter cover 20 has a sleeve sewn in the front through which one of the shelter frame members 18 is inserted and a rear sleeve 152 through which the rear other or shelter frame member 18 is inserted.

The shelter 16 is assembled to the seat frame 12. By means 154. The means 154 include openings 156, 158 on opposite sides of the seat frame through the top frame member 76 as seen in FIG. 5. The ends of the shelter frame 18 are inserted into their respective openings 156, 158 to position the shelter frame 18 on the seat frame 12. The shelter 16 is also secured to the seat frame 12 by the securing means 29 which may be of any conventional design such as snap fasteners having one portion secured to the cover 20 and another complimentary engageable portion secured to the seat frame 18.

Once the shelter 16 is assembled to the seat frame 12, the spreader 24, as seen in FIGS. 1, 8, and 9, is positioned between the shelter frame members 22. The spreader 24 includes an arcuately shaped tubular member 154. Each end 156 of the spreader 124 has an elastic retainer 160 positioned in each end thereof. The elastic retainer 160 includes a pair of opposing retainer portions which are expandable to retain therein the shelter frame members 18. By forcing the elastic retainer portions 160 around the outer diameter of the shelter frame 18, the spreader 24 is positioned between the frame members 22 to hold them apart from each other.

Having described my invention, I claim:

1. A portable sportsman seating apparatus including
a seat frame having a chamber and a seating surface on top of the chamber;
at least one ski having said seat frame mounted on said one ski for movement of the apparatus between locations;
a lantern mounted in said chamber;
said seat frame chamber having a bottom portion with at least one aperture therethrough to allow air to flow therethrough into said chamber to support combustion of said lantern in said chamber;
said seat frame chamber further defined by a plurality of sides, one of said sides of said chamber formed at least in part from a material that allows light to pass therethrough and another of said sides forms and defines the top of said chamber and has at least a portion formed from a material having apertures therethrough to allow the flow of heated air from the chamber; and
means for securing said lantern to said seat frame, said lantern having a base and a top, said lantern securing means including bottom lantern support means for removably securing the base of said lantern to said seat frame and a top lantern support means for removably securing said top of said lantern to said seat frame.

2. A portable sportsman seating apparatus as described in claim 1 in which said top lantern support means includes a first top lantern support having one end pivotally mounted to said seat frame, and a second top lantern support having one end pivotally connected to the opposite end of said first top lantern support and means for removably securing the opposite end of said second top lantern support to said lantern.

3. A portable sportsman seating apparatus including
a seat frame having a chamber and a seating surface on top of the chamber;
at least one ski having said seat frame mounted on said one ski for movement of the apparatus between locations;
a lantern mounted in said chamber;
said seat frame chamber having a bottom portion with at least one aperture therethrough to allow air to flow therethrough into said chamber to support combustion of said lantern in said chamber;
said seat frame chamber further defined by a plurality of sides, one of said sides of said chamber formed at least in part from a material that allows light to pass therethrough and another of said sides is the top of said chamber and has at least a portion formed from a material having apertures therethrough to allow the flow of heated air from the chamber;
a shelter frame and a shelter frame cover;
said shelter frame having at least a pair of frame members having an inverted generally "U" shape when in an assembled condition, the ends of each of said shelter frame members secured to said seat frame when in the assembled condition;
said shelter frame cover extending between said shelter frame members when in the assembled condition to provide a shelter above the seating surface with an opening adjacent said one side of said seat frame; and
means for securing said lantern to said seat frame, said lantern securing means including bottom lantern support means for removably securing a base of said lantern to said bottom of said seat frame and a top lantern support means for removably securing the top of said lantern to said seat frame.

* * * * *